US006501420B2

(12) United States Patent
Townsend et al.

(10) Patent No.: US 6,501,420 B2
(45) Date of Patent: Dec. 31, 2002

(54) MOBILE CELLULAR TELEPHONE COMPRISING A GPS RECEIVER

(75) Inventors: Stephen Townsend, Horley (GB); Iwo Mergler, Southampton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/780,739

(22) Filed: Feb. 9, 2001

(65) Prior Publication Data

US 2001/0017598 A1 Aug. 30, 2001

(30) Foreign Application Priority Data

Feb. 24, 2000 (GB) .............................. 0004371
May 31, 2000 (GB) .............................. 0013149

(51) Int. Cl.$^7$ .......................... G01S 5/14; H04M 11/00; H04Q 7/20
(52) U.S. Cl. ...................... 342/357.1; 455/404; 455/456
(58) Field of Search ....................... 342/357.1; 455/456, 455/457, 404

(56) References Cited

U.S. PATENT DOCUMENTS

| 5,592,173 A | * | 1/1997 | Lau et al. ............... 342/357.12 |
| RE35,920 E | * | 10/1998 | Sorden et al. ........... 342/357.07 |
| 5,841,396 A | | 11/1998 | Krasner ...................... 342/357 |
| 5,874,914 A | | 2/1999 | Krasner ...................... 342/357 |
| 6,115,596 A | * | 9/2000 | Raith et al. ................. 455/456 |
| 6,332,073 B1 | * | 12/2001 | Nilsson et al. .............. 455/404 |
| 2002/0065063 A1 | * | 5/2002 | Uhlik et al. ................ 455/404 |

FOREIGN PATENT DOCUMENTS

DE       19646603 A     11/1996

OTHER PUBLICATIONS

English Translation of DE 19646603 A1.*
Murrayb. Et Al, "Location Tracking System with Hands–Off Capabilities", May 1996.
Anonymous, "Mobile Telephone with Position Reporting System", vol. 41, No. 410, Jun. 1998.

* cited by examiner

Primary Examiner—Thomas H. Tarcza
Assistant Examiner—Fred H Mull
(74) Attorney, Agent, or Firm—Jack D. Slobod

(57) ABSTRACT

A mobile cellular telephone (100) is disclosed comprising a communications transmitter (103) and receiver (102) arranged for two-way communication with a base station (BS), and a GPS receiver (105, 106) arranged to power up in response to direct interaction between a user and the mobile phone (100) after the telephone has been switched on.

In particular, the GPS receiver (105, 106) may be arranged to power up in response to the user making a call to the emergency services. Recognition by the telephone of an emergency call being made may occur when the user enters the emergency call telephone number, or one or more, but not all of the digits of the emergency call telephone number.

3 Claims, 1 Drawing Sheet

MOBILE CELLULAR TELEPHONE COMPRISING A GPS RECEIVER

BACKGROUND OF THE INVENTION

This invention relates to a mobile cellular telephone comprising a GPS receiver.

It is known to provide a mobile cellular telephone with a GPS receiver for the purpose of enabling operators of cellular telephone networks to determine the location from which a call is made. Conventionally, this occurs by a network operator making a location request to the telephone via a telephone network base station; and in response to the request, the telephone powering up its GPS receiver to determine its location and transmitting information corresponding to its location back to the base station.

In such a telephone, the power consumption of the GPS receiver during GPS signal acquisition and tracking, and navigation processing can be high. Therefore, as a mobile cellular telephone typically has a finite battery capacity, it is preferable that the GPS receiver is powered up only when required. The battery capacity problem is further compounded by the fashion for the miniaturisation of mobile telephones (and their battery packs) for both aesthetic and ergonomic reasons.

For an emergency call to the emergency services, it is of course desirable for the call location to be available as soon as possible. However, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition, in fact to as little as a few seconds. Base station assistance is further described in U.S. Pat. Nos. 5,841,396 and 5,874,914 which are incorporated herein by reference.

SUMMARY OF THE INVENTION

Not withstanding the above improvement, it is desirable to further reduce the TTFF. It is also an object of the present invention to do so.

According to the present invention, a mobile cellular telephone is provided comprising a communications transmitter and receiver arranged for two-way communication with a base station, and a GPS receiver characterised in that the GPS receiver is arranged to power up in response to direct interaction between a user and the mobile phone after the telephone has been switched on.

Such a GPS receiver is able to immediately commence processing GPS signals in order to retrieve the pseudorange information and determining its current position, without waiting for call connection or a location request transmitted from a base station. This is beneficial in that GPS processing prior to call connection reduces the risk of signal interference and drowning of the GPS signal caused by the mobile unit's transmitter transmitting encoded voice or other data to a base station and perhaps also caused by the mobile unit's receiver receiving base station replies.

Furthermore, as powered up only when required, the overall power consumption of the GPS receiver (and therefore the telephone) remains relatively low.

In particular, but not exclusively, the GPS receiver may be arranged to power up in response to the user making a particular call, for example, to the emergency services.

In such an arrangement, recognition by the telephone of a particular call being made may occur when the user enters the call telephone number, for example, by typing on a keypad or using speech recognition.

Alternatively, recognition may occur when the user enters one or more, but not all of the digits of the call telephone number. In such an event, the GPS receiver may be arranged to power down should that the number being entered by the user deviate from the call telephone number, thus saving power.

As an alternative to call recognition, the GPS receiver may be arranged to power up in response to a change in the strength of the signals received from a base station of a cellular radio transmission system, e.g. indicative of the mobile telephone being removed from a pocket or briefcase; to detected movement of the mobile telephone, e.g. when detected by an accelerometer located in the mobile telephone; a change in temperature of the telephone or pressure applied to the telephone, indicative of handling by the user; or to the retracting of a cover on the mobile telephone, e.g. in the case of a mobile telephone with a sliding cover protecting the key pad, by retracting the cover, or in the case of a "flip top" mobile telephone, by flipping the cover. The GPS receiver may be arranged to power up in response to a combination of these features, possible determined by fuzzy logic.

For an Internet enabled mobile telephone with a GPS receiver, the GPS receiver may be arranged to power up in response to the user selecting a particular web site, for example, a website associated with a location based service whereby the call location is determined in anticipation of a request from that website.

BRIEF DESCRIPTION OF THE DRAWINGS

These and other aspects of the invention will be apparent from and elucidated with reference to the embodiments described hereinafter, by way of example, with reference to the accompanying drawings in which.

DETAILED DESCRIPTION OF THE PREFERRED EMBODIMENTS

Figure 1:
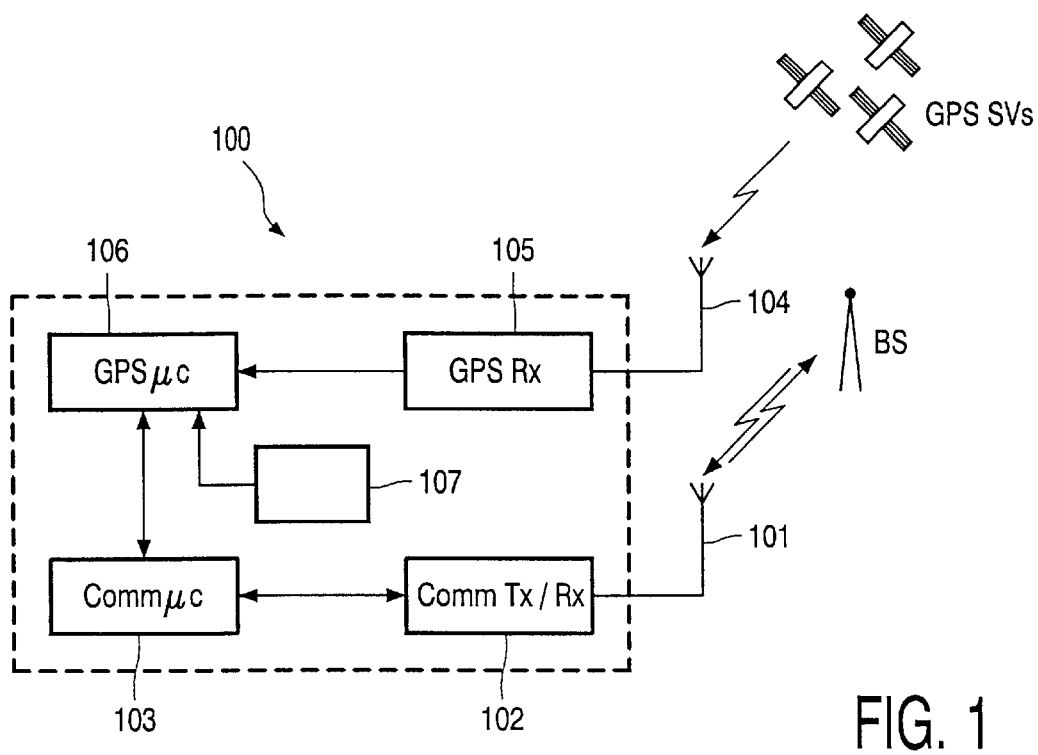
FIG. 1 shows, schematically, a mobile cellular telephone according to the present invention.

Referring to FIG. 1, mobile cellular telephone 100 is shown comprising a communications transmitter (Comm Tx) and receiver (Comm Rx) 102 connected to a communications antenna 101 and controlled by a communications microprocessor (Comm μc) 103 for communication with the base station BS with which it is registered. The design and manufacturing of such telephones for two-way communication within a cellular telephone network are well known, those parts which do not form part of the present invention will not be elaborated upon here further.

In additional to the conventional components of a mobile telephone, the telephone 100 further comprises a GPS receiver (GPS Rx) 105 connected to a GPS antenna 104 and controlled by a GPS microprocessor (GPS µc) 106, and detection means 107 for detecting interaction between a user and the mobile phone. In response to detecting such interaction, the GPS receiver 105 is powered up whereby it may receive NAVSTAR SPS GPS signal through the GPS antenna 104 and pre-process them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 106 which is powered up at the same time as the GPS receiver 105. The GPS signals may then be are acquired and tracked for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 105 may be implemented in the form a general purpose microprocessor, optionally common with the communications microprocessor 102, or a microprocessor embedded in a GPS application specific integrated circuit (ASIC).

Figure 2:
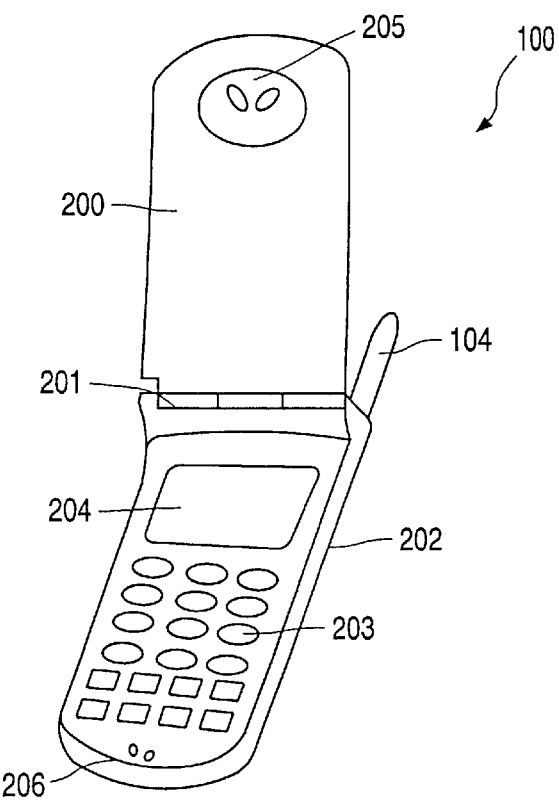
FIG. 2 shows, pictorially, the mobile cellular telephone of FIG. 1.

The mobile cellular telephone 100 is shown pictorially in FIG. 2. A flip cover 200 is attached by a hinge 201 to the body 202 of the mobile telephone on which is further mounted a keypad 203, which in this embodiment provides the detection means 107, and a display 204. Also visible on the outside of the telephone is the communications antenna 104 and perforations in both the flip cover 205 and body 206 of the mobile telephone which allow passage of sound waves from an ear piece speaker (not shown) located within the flip cover 200 and to a microphone (not shown) located within the body 202 of the mobile phone respectively.

When the mobile telephone is switched on, the GPS receiver 105 and microprocessor 106 of the mobile cellular telephone 100 remain inoperative and do so until a user attempts to makes an emergency call to the emergency service's operator. Upon the user typing "99", the GPS receiver and microprocessor is powered up in anticipation of a future request from the network operator for the location of the telephone.

Should the user then complete the "999" emergency services number and as a consequence connect to the emergency services operator, upon receiving an request for the telephones location, the location position is provided by the GPS microprocessor 105 to the communication processor 103 and transmitted to the operator via the base station with which the telephone is registered. Alternatively, pseudorange information may be provided to the base station and the position derived from this, remote from the mobile cellular telephone.

In the event that the number being typed by the user deviates from that expected for the emergency services telephone number, e.g. the user types 997, the GPS receiver 105 and microprocessor 106 power down. As an alternative to power up based on a user typing an emergency services number, the telephone may power up in response to flipping the flip cover, indicative of the phone being prepared for use.

Note, the number for the emergency services in the UK is "999" and "99" represents the first two digits of that number.

In the US, the emergency services operator is termed the public safety answer point (PSAP) whose number is "911" and therefore the equivalent first two digits appropriate for a US configured mobile telephone would be "91". Of course, the principle is equally applicable to countries with different emergency call telephone numbers and is therefore described with reference to the UK and the number "999" for illustration purposes only.

Optionally, base station assistance of the type discuss above may be provided to the GPS receiver in order for the receiver to acquire the GPS signals more quickly.

As stated previously, as an alternative to a keypad interaction, the GPS receiver may be arranged to power up in response to a change in the strength of the signals, to detected movement, to a change in temperature or pressure, or to handling by the user. In such cases, the detection means 107 may comprise the appropriate signal processing to determine the signal-to-noise ratio, an accelerometer located in the mobile telephone, a temperature sensor, a pressure sensor, and a movement sensor or actuator respectively. Indeed, many other alternatives to these components would suggest themselves to a person skilled in the art.

Also, at present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of radio transmitters at different locations and a receiver which determines its location based on the time of arrival of the transmissions of the radio transmitters.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A mobile cellular telephone comprising a communications transmitter and receiver arranged for two-way communication with a base station, and a GPS receiver; wherein the GPS receiver is arranged to power up upon the entering of at least a first digit but less than all the digits of a predesignated telephone number.

2. The mobile cellular telephone as claimed in claim 1, wherein the GPS receiver is arranged to power down in the event that the number being entered by the user is not the predesignated telephone number.

3. An internet enabled, mobile cellular telephone comprising a communications transmitter and receiver arranged for two-way communication with a base station, and a GPS receiver, wherein the GPS receiver is arranged to power up in response to a user selecting a particular web site.

* * * * *

(12) INTER PARTES REVIEW CERTIFICATE (73rd)
United States Patent
Townsend et al.

(10) Number: US 6,501,420 K1
(45) Certificate Issued: Mar. 27, 2015

(54) MOBILE CELLULAR TELEPHONE COMPRISING A GPS RECEIVER

(75) Inventors: Stephen Townsend; Iwo Mergler

(73) Assignee: Morgan Stanley Senior Funding, Inc.

Trial Number:

IPR2013-00233 filed Apr. 2, 2013

Petitioner: Blackberry Corporation

Patent Owner: NXP B.V.

Inter Partes Review Certificate for:

Patent No.: 6,501,420
Issued: Dec. 31, 2002
Appl. No.: 09/780,739
Filed: Feb. 9, 2001

The results of IPR2013-00233 are reflected in this inter partes review certificate under 35 U.S.C. 318(b).

INTER PARTES REVIEW CERTIFICATE
U.S. Patent 6,501,420 K1
Trial No. IPR2013-00233
Certificate Issued Mar. 27, 2015

AS A RESULT OF THE INTER PARTES REVIEW PROCEEDING, IT HAS BEEN DETERMINED THAT:

Claim 3 is cancelled.

* * * * *